(12) United States Patent
Maurer

(10) Patent No.: US 7,636,492 B2
(45) Date of Patent: Dec. 22, 2009

(54) SELECTIVE SMOOTHING INCLUDING BLEED-THROUGH REDUCTION

(75) Inventor: Ron P. Maurer, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1154 days.

(21) Appl. No.: 10/376,888

(22) Filed: Feb. 28, 2003

(65) Prior Publication Data

US 2004/0169891 A1 Sep. 2, 2004

(51) Int. Cl.
G06K 9/40 (2006.01)
G06K 9/44 (2006.01)
H04N 1/40 (2006.01)

(52) U.S. Cl. .......................... 382/274; 382/264; 358/448

(58) Field of Classification Search ................. 358/1.2, 358/1.9, 3.03, 3.04, 3.23, 3.27, 532, 463, 358/443, 530, 2.1; 382/260, 252, 263, 264, 382/266, 274

See application file for complete search history.

(56) References Cited

U.S. PATENT DOCUMENTS

| 4,860,118 A | | 8/1989 | Arimoto | |
|---|---|---|---|---|
| 5,337,162 A | | 8/1994 | Sakano | |
| 6,101,283 A | * | 8/2000 | Knox | 382/254 |
| 6,227,725 B1 | | 5/2001 | Ancin et al. | |
| 6,496,560 B1 | * | 12/2002 | Lin et al. | 378/62 |
| 7,050,650 B2 | * | 5/2006 | Maurer et al. | 382/275 |
| 7,064,863 B2 | * | 6/2006 | Fukuda et al. | 358/1.9 |
| 2001/0050778 A1 | * | 12/2001 | Fukuda et al. | 358/1.9 |
| 2003/0161007 A1 | * | 8/2003 | Maurer et al. | 358/3.26 |
| 2004/0114826 A1 | * | 6/2004 | Bhattacharjya | 382/274 |

FOREIGN PATENT DOCUMENTS

| EP | 1154634 A2 * | 11/2001 |
|---|---|---|
| JP | 06030308 A | 2/1994 |
| WO | WO 02/28087 | 4/2002 |

OTHER PUBLICATIONS www.printingforles.com/printingglossary.html; glossary term = "bleed".*
www.dictionary.oed.com/framesok/logo.dtl; Oxford English Dict. term = contrast.*
www.dictionary.oed.com/framesok/logo.dtl; Oxford English Dict. term = intensity.*
www.vistek.ca.glossary; term = intensity.*
www.printingforles.com/printingglossary.html; glossary term = "bleed", Apr. 11, 2007.*
www.dictionary.oed.com/framesok/logo.dtl; Oxford English Dict. term = contrast, Apr. 11, 2007.*
www.dictionary.oed.com/framesok/logo.dtl; Oxford English Dict. term = intensity, Apr. 11, 2007.*
www.vistek.ca.glossary; term = intensity, Apr. 11, 2007.*

* cited by examiner

Primary Examiner—Jerome Grant, II

(57) ABSTRACT

A group of pixels of a digital image is processed to reduce bleed-through. The processing includes generating an upper bound for each pixel of the group; and taking a weighted average of the upper bound and original pixel intensity for each pixel of the group.

30 Claims, 3 Drawing Sheets

SELECTIVE SMOOTHING INCLUDING BLEED-THROUGH REDUCTION

BACKGROUND

Bleed-through is a type of noise or distortion that is specific to scanned images of double-sided documents. When one side of a double-sided document is scanned, features on the opposite side of the document can be captured. These features appear as artifacts in the scanned digital image, manifested as phantoms of text characters and other dark features from the other side. Bleed-through can also be caused by documents underlying the scanned document. Dark features from these underlying documents can bleed through during scanning.

Bleed-through can reduce visual quality of a digital image. The bleed-through can also reduce compressibility of a digital image. Reducing the compressibility increases the cost of storing and transmitting digital images.

SUMMARY

According to one aspect of the present invention, a group of pixels of a digital image is processed to reduce bleed-through. The processing includes generating an upper bound for each pixel of the group; and taking a weighted average of the upper bound and original pixel intensity for each pixel of the group.

Other aspects and advantages of the present invention will become apparent from the following detailed description, taken in conjunction with the accompanying drawings, illustrating by way of example the principles of the present invention.

DETAILED DESCRIPTION

Figure 1:
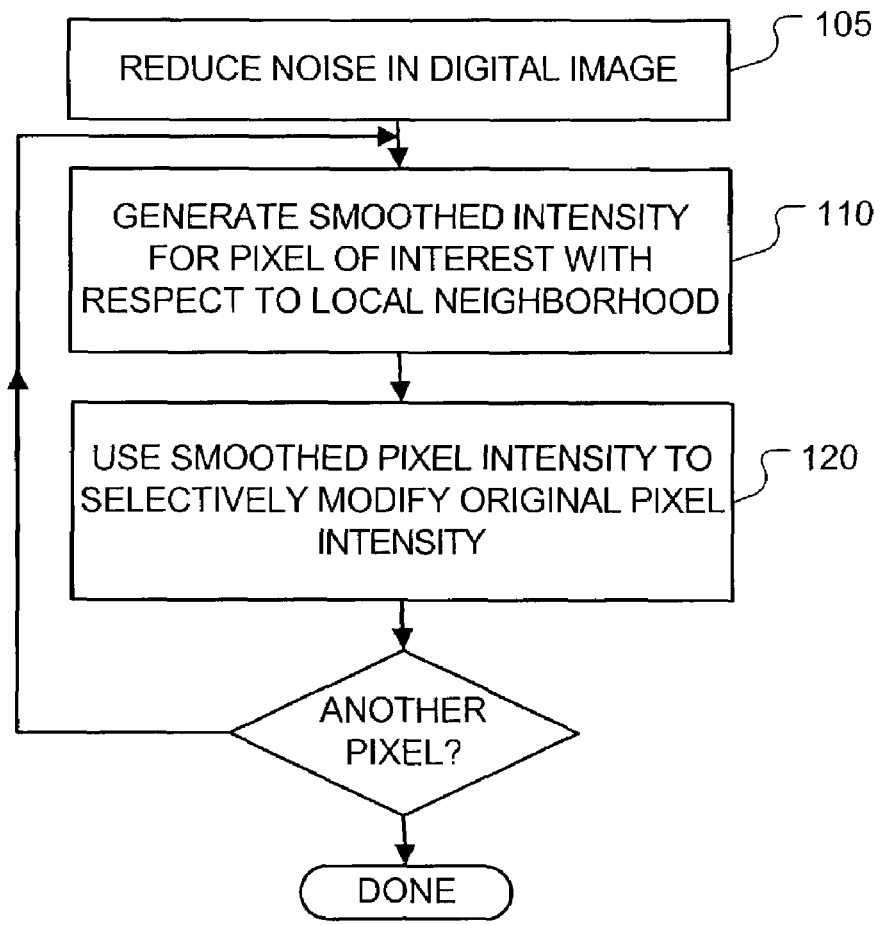
FIG. 1 is an illustration of a digital image processing method in accordance with an embodiment of the present invention.

Reference is made to FIG. 1, which illustrates a method of processing a scanned grayscale image. The method includes performing selective smoothing on the grayscale image. The selective smoothing is performed on a pixel-by-pixel basis. For each pixel of interest, a smoothed pixel intensity is generated with respect to a local pixel neighborhood (110); and the smoothed pixel intensity is used to selectively modify the original pixel (120). The modified intensity is used in an output image. The selective smoothing greatly reduces bleed-through in the output image, while preserving other aspects of image quality (e.g., sharpness and contrast of foreground features relative to the local background). The selective smoothing also reduces noise in patches of background and foreground interior.

Figure 1A:
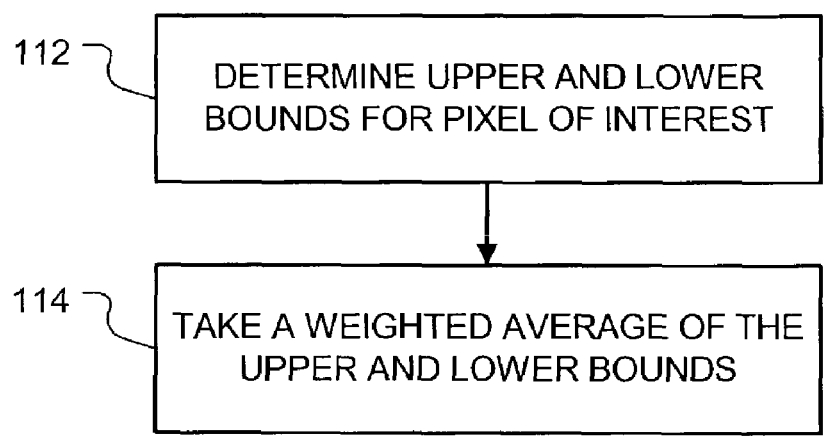
FIG. 1a is an illustration of an exemplary method of generating a smoothed pixel intensity.

FIG. 1a illustrates an exemplary method of generating a smoothed pixel intensity. Upper and lower bounds for the pixel of interest are generated (112); and a weighted average of the upper and lower bounds is taken (114). The upper bound is guaranteed to have an equal or higher intensity than the pixel of interest, and it is guaranteed not to exceed a maximum intensity in a prescribed neighborhood. The prescribed neighborhood may be local. The lower bound is guaranteed to have an equal or lower intensity than the pixel of interest, and is guaranteed not to fall below a minimum intensity in a prescribed neighborhood. The upper and lower bounds may be found by taking the maximum and minimum intensity values of a local neighborhood. However, they are not so limited. As an example, the upper bound is not allowed to deviate more than a prescribed intensity (T) above the original pixel intensity (I). The local maximum (M) is determined, and the intensity (I+T) is used to limit the local maximum (M). Thus the upper bound (U) is U=M for M<I+T, and U=I+T otherwise. Similarly, the local minimum (m) is determined, and the intensity (I−T) is used to limit the local minimum (M). Thus the lower bound (L) may be L=m for m>I−T, and L=I−T otherwise.

The weighted average (G) may be computed as $$G = \alpha U + (1-\alpha)L = L + \alpha(U-L); \quad (0 \leq \alpha \leq 1)$$

where $\alpha$ is a local lightening weight. The local lightening weight ($\alpha$) is determined by the potential visibility of bleed-through at the pixel of interest. The local lightening weight ($\alpha$) is a non-decreasing function of $I_L$, where $I_L$ is a local intensity value derived from the local neighborhood. The local intensity $I_L$ may be, for example, $I_L = (U+L)/2$; or $I_L = (U+2I+L)/4$; or $I_L = I$. The local lightening weight ($\alpha$) spans the entire range from 0 to 1. For dark pixels (I→black), or pixels residing in a dark neighborhood, $\alpha \to 0$. For light pixels (I→white) or pixels residing in a light neighborhood, $\alpha \to 1$.

Figure 2:
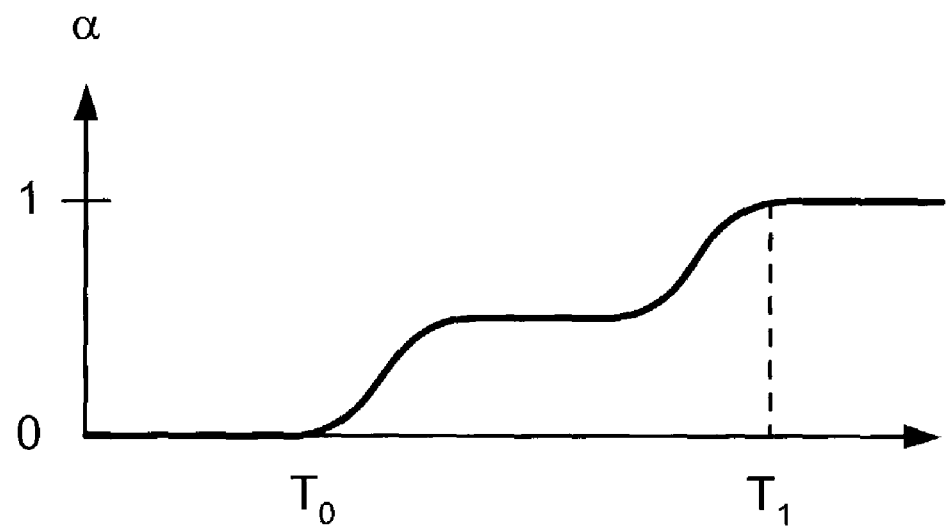
FIGS. 2 and 3 are illustrations of exemplary weight profiles for the method of FIG. 1.

An exemplary profile for the local lighting weight ($\alpha$) is illustrated in FIG. 2. The weight $\alpha = 0$ occurs for $I_L < T_0$, where $T_0$ represents the threshold for a dark feature; and $\alpha = 1$ occurs for $I_L > T_1$ where $T_1$ corresponds to the threshold for a light background. The local lightening weight ($\alpha$) is non-decreasing for values of $I_L$ from $T_0$ to $T_1$.

As another example, the local lighting weight ($\alpha$) can result from a hard selection. The local lighting weight $\alpha = 0$ between $I_L \times 0$ and some threshold, and $\alpha = 1$ above the threshold.

A high weight is assigned to the upper bound when the potential for bleed-through visibility is high, and a low weight is assigned to the upper lower bound when the potential for bleed-through visibility is low. Bleed-through has a stronger effect when laid on a lighter background than on a darker background and, therefore, is more noticeable (and more disturbing), and has a greater impact on compressibility. Bleed-through can occur in darker tones, but it is usually imperceptible or barely perceptible.

Bleed-through has a photometric characteristic of always reducing the local luminance of the pixel relative to what it should be (unlike random noise). Bleed-through appears as a dip in luminance (that is, slightly darker) relative to the local neighborhood. In geometrical terms, bleed-through typically corresponds to narrow text character strokes or black graphic lines. Thus by assigning a high weight to the upper bound, the bleed-through in light neighborhoods is lightened to a similar level as the local neighborhood, whereby the visibility of bleed-through in the output image is greatly reduced.

Assigning a high weight to the lower bound has a different effect. It causes smoothing of noise (other than bleed-through) in dark foregrounds, and it causes slight darkening of dark foregrounds, thus enhancing genuine text and line art.

The profile for the local lightening weight need not be symmetrical with respect to the upper and lower bounds. The profile can be biased toward the upper bound. Such bias gives a preference to lighter backgrounds. For example, α=0 for $I_L<T_0$, and then over a short range the local lightening weight rises quickly to α=1.

The smoothing tends to blur edges. Therefore, for each pixel, the smoothed pixel intensity is selectively used to modify the original pixel intensity. For example, the smoothed pixel intensity would not be used to modify the original intensity of a pixel that is part of a certain feature (an edge) to be preserved. However, the intensity of a pixel that is far away from an edge would be modified (e.g., replaced) by the smoothed intensity in order to reduce bleed-through and smooth background patches and patches in foreground interiors.

Edges and other details of the scanned image may be preserved by examining the local contrast of each pixel of interest. Bleed-through tends to have much lower contrast than genuine text or dark features on the page that was actually scanned. For example, typical text can have a contrast relative to the background of half or more of the maximal page contrast (~150 gray levels in 8-bit representation), while bleed-through typically has a contrast of only several percent of the maximal page contrast (5-20 gray-levels in 8-bit representation). Hence bleed-through can be considered a special type of noise or distortion of the original visual intention, which has some special properties by its physical model.

Edges and other details of the scanned image may be preserved by taking the following weighted average:

$$R=\beta G+(1-\beta)I=I+\beta(G-I); (0\leq\beta\leq 1)$$

where R is intensity of a pixel in the output image, and β is a smoothing weight. The smoothing weight (β) is a function of contrast (D) of the pixel of interest with respect to its local neighborhood. The local contrast (D) may be computed as D=U−L. The smoothing weight is β=1 for $0\leq D<T_b$, where $T_b$ is a threshold. The threshold $T_b$ is a contrast above which the pixel of interest is probably not part of bleed-through. The smoothing weight is β=0 for D>$T_e$, where $T_e$ is a contrast for which the pixel is probably an edge, and where $T_e>T_b$. Thus β=0 (no smoothing) would cause the original pixel intensity to be used in the output image (i.e., R=I) and thereby help preserve an edge in the output image. In contrast, β=1 (full smoothing) would cause the smoothed pixel intensity be used in the output image (i.e., R=G). The smoothing weight is a non-increasing function of D from between $T_b$ to $T_e$. For values of D where $T_b\leq D\leq T_e$ it is uncertain whether the pixel is part of an edge or bleed-through. Therefore, the transition between these two thresholds $T_e$ and $T_b$ should be smooth to avoid hard classification artifacts.

The following piecewise linear function of local contrast (D) may be used for the smoothing weight (β).

$$\beta(D) = \min\left\{1, \max\left[0, \frac{D-T_b}{T_e-T_b}\right]\right\}$$

Figure 3:
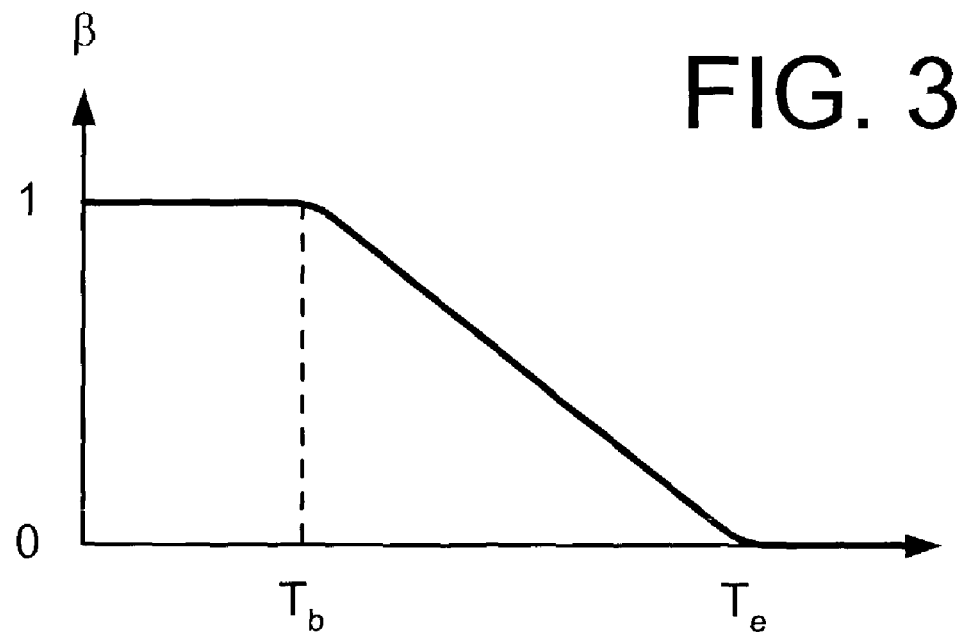

This function is illustrated in FIG. 3.

Knowledge of the relative contrast for bleed-through and genuine features can increase the accuracy of the thresholds $T_e$ and $T_b$ and, therefore, the quality of the output image. For instance, these thresholds can be based on statistics of the local contrast of scanned images in the same setting (e.g., the same scanner resolution, the same pre-processing).

In examples above, a smoothed pixel intensity (G) is computed as a first weighted average of the upper and lower bounds, and an output pixel intensity (R) is computed as a second weighted average of the smoothed pixel intensity and the original pixel intensity. Instead, the output pixel (R) can be computed in a single step as a weighted average of the upper and (optionally) lower bounds and the original pixel intensity.

As shown in FIG. 1, the processing method may further include reducing noise in the digital image (105) prior to generating the upper and lower bounds. Reducing the noise results in better accuracy of the upper and lower bounds. For example, it is desirable to remove halftoning noise, which can be particularly strong. The halftoning noise may be reduced by using inverse halftoning as described in assignee's U.S. Serial No. PCT/US2004/005863.

Although the method was described above in connection with a grayscale image, it is not so limited. The method may be applied to color digital images. It is usually enough to perform the selective smoothing only on the luminance channel of the color image, since bleed-through usually involves black or otherwise dark features, and since these dark features have very little influence on chrominance.

Figure 4:
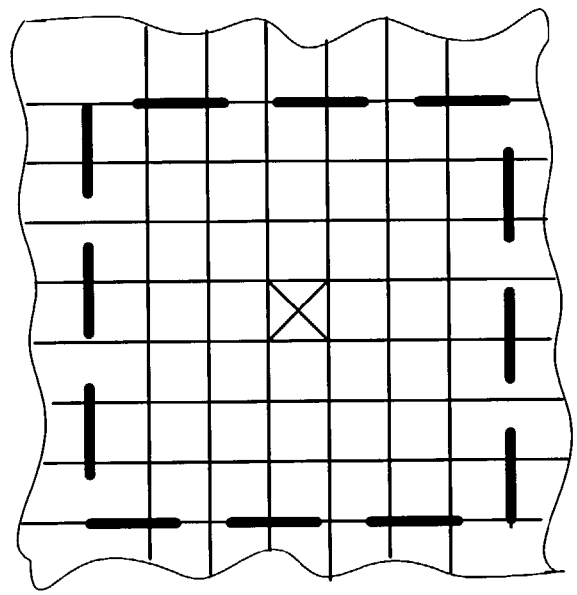
FIG. 4 is an illustration of an exemplary neighborhood of pixels for the method of FIG. 1.

An exemplary local neighborhood is illustrated in FIG. 4. The exemplary local neighborhood is delineated by a window indicated in dashed lines. Preferably, the neighborhood should be symmetric about the pixel of interest (the pixel of interest in FIG. 4 is denoted by an "X"). Although a 7×7 array of pixels is illustrated, the local neighborhood is not limited to any particular size or shape.

Thus disclosed is a method for reducing bleed-through, while preserving other aspects of scanned image quality. Bleed-through is reduced without essentially modifying the regional background tone. Consequently, tone-fidelity is not compromised, and bleed-through is reduced as effectively in non-white backgrounds as it is in white backgrounds. As an additional benefit, noise in low contrast regions (patches of background and foreground interiors) is smoothed, even when the low contrast regions do not contain bleed-through. Reducing the bleed-through also improves image compressibility, since bleed-through usually has a high content of spatial information that requires a considerable amount of bits to compress. Smoothing the noise in patches of background and foreground interiors further improves image compressibility.

The method is not limited to any particular application. Selective reduction of bleed-through is useful as pre-processing for compression and applications such as text recognition (OCR) and page segmentation.

The method according to the present invention is not limited to the use of upper and lower bounds. The present invention can be practiced without determining the lower bounds for the pixels. For example, the pixel of interest may be smoothed with respect to the upper bound only, whereby bleed-through would be reduced, but smoothing and darkening of dark foreground features would not be performed. A smoothed pixel intensity value (G*) is computed as a weighted average of U and I (instead of U and L):

$$G^*=\alpha U+(1-\alpha)I=I+\alpha(U-I); (0\leq\alpha\leq 1).$$

The local lightening weight α is closer to 1 when the local intensity value ($I_L$) is high (corresponding to a light background) and closer to 0 when the local intensity value $I_L$ is low. A second weighted average is then taken between G* and I:

$$R=\beta G^*+(1-\beta)I=I+\beta(G^*-I); (0\leq\beta\leq 1).$$

The smoothing weight β is not a function of D=U−L, since the lower bound L is not computed. Instead, the smoothing weight β is a function of $D_U=U-I$, where β decreases gradually from $\beta(D_U=0)=1$, to $\beta(D_U=T_b)=0$, in a non-increasing manner and is zero for $D_U>T_b$. A single weighted average (instead of two) can be taken as follows.

$$R=I+\alpha(I_L)\beta(U-I)\cdot(U-I)=I+\alpha(I_L)\psi(U-I)$$

where $\psi(D_U) \cong \beta(D_U) \cdot D_U$.

Figure 5:
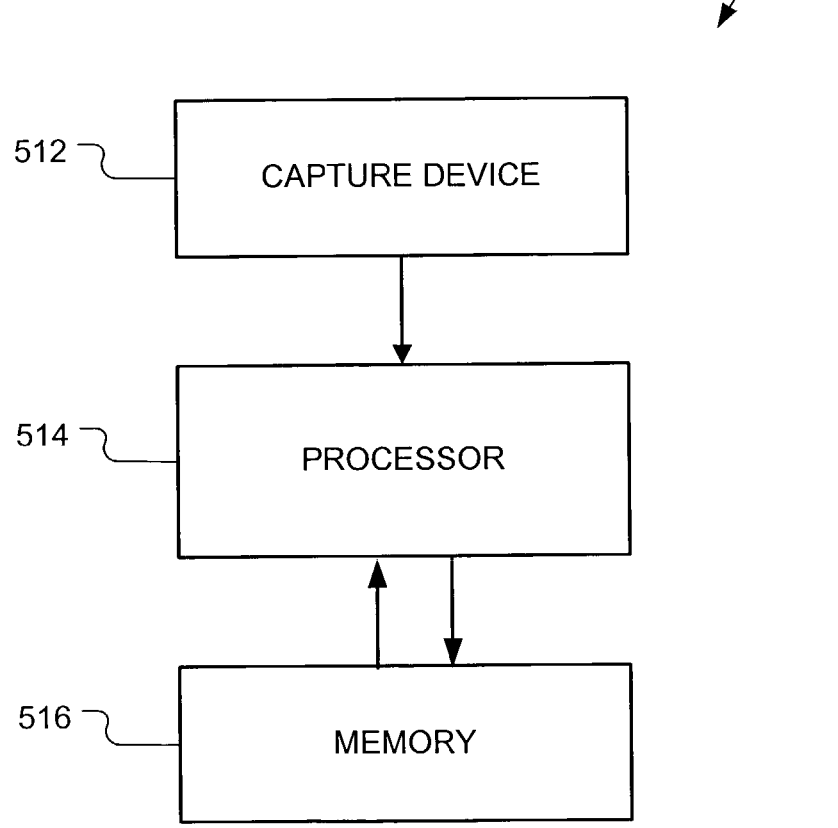
FIG. 5 is an illustration of a digital imaging system including a machine for performing the method of FIG. 1.

FIG. 5 shows a digital imaging system 510. An image capture device 512 scans a document and provides lines of a digital image to a processor 514. The processor 514 may store all of the lines of the digital image in memory 516 for processing later, or it may process the scanned image in real time. The output image may be stored in the memory 516. The processor 514 may use hardware, software or a combination of the two to process the digital image according to the method of FIG. 1. The processor may perform additional processing as well.

In a software implementation, the memory 516 stores a program that, when executed, instructs the processor 514 to perform the method of FIG. 1. The processor 514 and memory 516 may be part of a personal computer or workstation, they may be embedded in an image capture device 512, etc.

In a hardware or software implementation, the processing can be performed using only integer arithmetic and precomputed lookup table terms. Thus the processing can be implemented in a very efficient manner in real time.

The processing is not limited to any particular type of image. It may be applied to images containing only text and other computer-generated features, images containing only natural features, and compound documents containing natural features and computer-generated features.

The present invention is not limited to the specific embodiments described and illustrated above. Instead, the invention is construed according to the claims that follow.

The invention claimed is:

1. A method of reducing bleed-through in a scanned image, the scanned image including a group of pixels, the method comprising:
    generating, using a processor, an upper bound for each pixel of the group, each upper bound based on intensity values of a local pixel neighborhood and taking a weighted average of the upper bound and original pixel intensity for each pixel of the group.

2. The method of claim 1, further comprising generating a lower bound for each pixel of the group; wherein the lower bound is included in the weighted average.

3. The method of claim 2, wherein the upper and lower bounds for each pixel are based on local pixel neighborhoods.

4. The method of claim 2, wherein taking the weighted average includes taking a first weighted average of the upper and lower bounds to yield a smoothed pixel intensity, and taking a second weighted average of the smoothed pixel intensity and the original pixel intensity, the second weighted average yielding an output pixel.

5. The method of claim 4, wherein certain features in the scanned image are preserved by not pushing intensity of the output pixel toward the smoothed intensity.

6. The method of claim 4, wherein the first weighted average is generated as $G=\alpha U+(1-\alpha)L$ for $(0\leq\alpha\leq1)$, where G is the smoothed pixel intensity, U and L are the upper and lower bounds, and α is a local lightening weight that is a function of local intensity.

7. The method of claim 6, wherein the local lightening weight is biased toward $\alpha=1$.

8. The method of claim 4, wherein the second weighted average is taken as $R=\beta G+(1-\beta)I$ for $(0\leq\beta\leq1)$, where G is the smoothed pixel intensity, I is the original pixel intensity, β is a smoothing weight, and R is an output pixel.

9. The method of claim 1, wherein the weighted average smoothes pixel intensity dips in light regions.

10. The method of claim 2, wherein the weighted average darkens and smoothes dark foreground pixel intensities in dark regions.

11. The method of claim 1, further comprising reducing noise in the digital image prior to generating the upper bound.

12. The method of claim 1, wherein the digital image is a color image, and wherein only a luminance channel of the color image is processed by generating the smoothed pixel intensity and selectively using the original pixel intensity.

13. A method of processing a pixel of a digital image, the method comprising:
    generating, using a processor, a smoothed pixel intensity with respect to a local pixel neighborhood; and selectively using original pixel intensity to modify the smoothed pixel intensity to help preserve a certain feature of the digital image.

14. The method of claim 13, wherein the pixel intensity is smoothed by generating a weighted average of upper and lower bounds of the pixel; wherein weighting is a function of a local intensity value.

15. The method of claim 13, wherein the smoothed intensity is selectively used by taking a weighted average of the smoothed pixel intensity and the original pixel intensity; wherein weighting is a function of local contrast.

16. A digital imaging system comprising:
    a capture device for generating a digital image; and
    a processor for performing bleed-through reduction on a plurality of pixels of the digital image, for each pixel the processor generating an upper bound for each pixel of the group, and taking a weighted average of the upper bound and original pixel intensity for each pixel of the group, the upper bound for each pixel based on intensity values of a local pixel neighborhood.

17. An article for causing a processor to perform bleed-through reduction on a group of pixels of a digital image, the article comprising memory encoded with code for instructing the processor to process the group of pixels by generating an upper bound of pixel intensity for each pixel of the group, and taking a weighted average of the upper bound and original pixel intensity for each pixel of the group, each upper bound computed from a local pixel neighborhood.

18. The article of claim 17, wherein the code further instructs the processor to generate a lower bound and include the lower bound in the weighted average for each pixel of the group.

19. The article of claim 18, wherein the upper and lower bounds for each pixel are based on local pixel neighborhoods.

20. The article of claim 18, wherein taking the weighted average includes taking a first weighted average of the upper and lower bounds to yield a smoothed pixel intensity, and taking a second weighted average of the smoothed pixel intensity and the original pixel intensity, the second weighted average yielding an output pixel.

21. The article of claim 20, wherein certain features are preserved by not pushing intensity of the output pixel toward the smoothed intensity.

22. The article of claim 20, wherein the first weighted average is generated as $G=\alpha U+(1-\alpha)L$ for $(0\leq\alpha\leq1)$, where G is the smoothed pixel intensity, U and L are the upper and lower bounds, and α is a local lightening weight that is a function of local intensity.

23. The article of claim 20, wherein the second weighted average is taken as $R=\beta G+(1-\beta)I$ for $(0\leq\beta\leq1)$, where G is the smoothed pixel intensity, I is the original pixel intensity, $\beta$ is a smoothing weight, and R is an output pixel.

24. Apparatus for performing bleed-through reduction on a group of pixels of a digital image, the apparatus comprising a processor for processing the pixels, the processing including generating an upper bound for each pixel of the group, and taking a weighted average of the upper bound and original pixel intensity for each pixel of the group, each upper bound based on intensity values of a local pixel neighborhood.

25. The apparatus of claim 24, the processor further generating a lower bound for each pixel of the group; wherein the lower bound is included in the weighted average.

26. The apparatus of claim 25, wherein the upper and lower bounds for each pixel are based on local pixel neighborhoods.

27. The apparatus of claim 25, wherein taking the weighted average includes taking a first weighted average of the upper and lower bounds to yield a smoothed pixel intensity, and taking a second weighted average of the smoothed pixel intensity and the original pixel intensity, the second weighted average yielding an output pixel.

28. The apparatus of claim 27, wherein certain features are preserved by not pushing intensity of the output pixel toward the smoothed intensity.

29. The apparatus of claim 27, wherein the first weighted average is generated as $G=\alpha U+(1-\alpha)L$ for $(0\leq\alpha\leq1)$, where G is the smoothed pixel intensity, U and L are the upper and lower bounds, and $\alpha$ is a local lightening weight that is a function of local intensity.

30. The apparatus of claim 27, wherein the second weighted average is taken as $R=\beta G+(1-\beta)I$ for $(0\leq\beta\leq1)$, where G is the smoothed pixel intensity, I is the original pixel intensity, $\beta$ is a smoothing weight, and R is an output pixel.

* * * * *

UNITED STATES PATENT AND TRADEMARK OFFICE
CERTIFICATE OF CORRECTION

PATENT NO. : 7,636,492 B2 Page 1 of 1
APPLICATION NO. : 10/376888
DATED : December 22, 2009
INVENTOR(S) : Ron P. Maurer It is certified that error appears in the above-identified patent and that said Letters Patent is hereby corrected as shown below:

In column 5, line 44, in Claim 1, delete "neighborhood" and insert -- neighborhood; --, therefor.

In column 8, line 9, in Claim 29, delete "$G=\alpha U+(1—\alpha)L$" and insert -- $G=\alpha U+(1-\alpha)L$ --, therefor.

Signed and Sealed this

Eighth Day of June, 2010

David J. Kappos
*Director of the United States Patent and Trademark Office*